Aug. 9, 1949.  J. R. LEMON  2,478,289
DRIVE TRANSMITTING DEVICE
Filed June 23, 1945  3 Sheets-Sheet 1
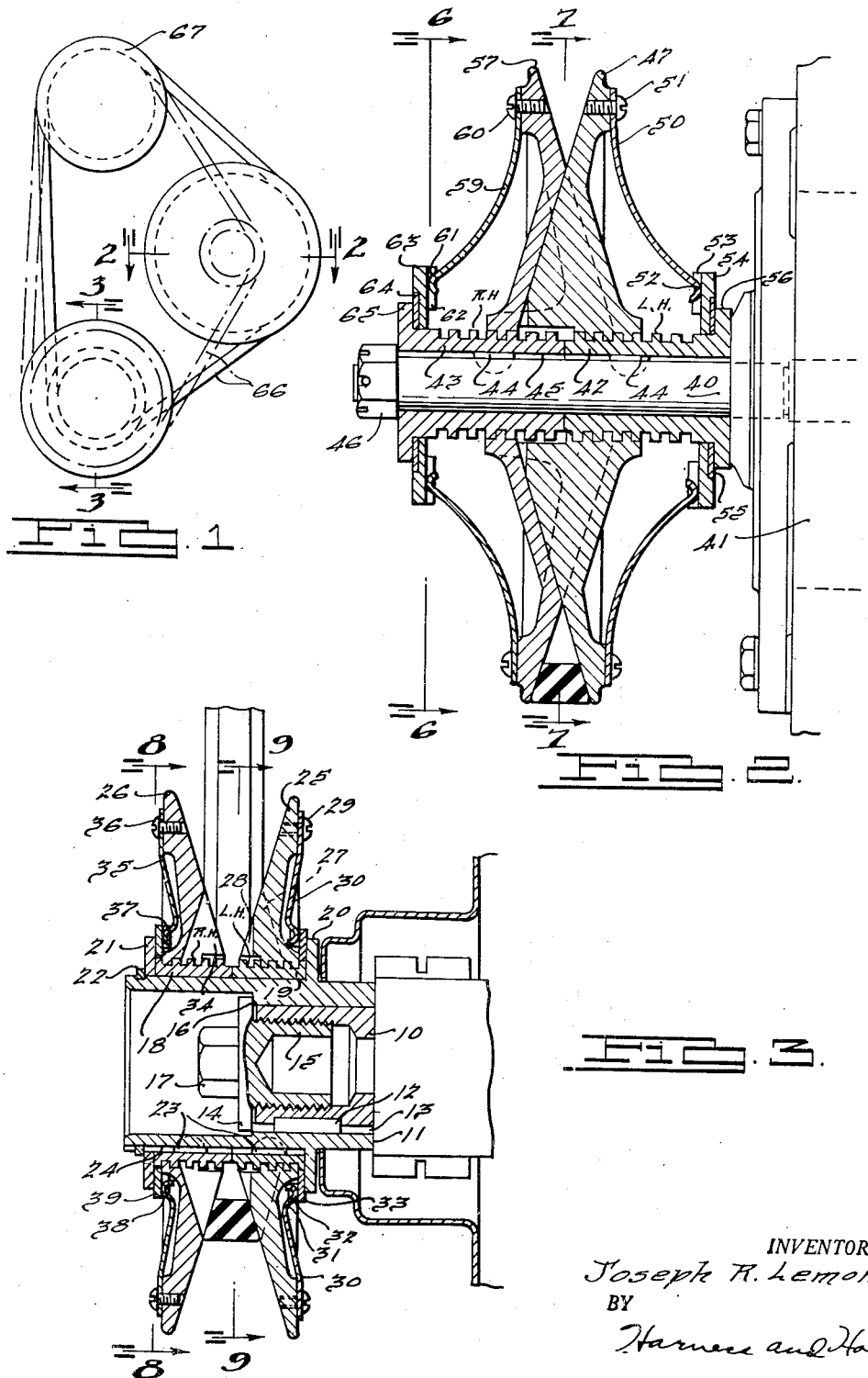
INVENTOR.
Joseph R. Lemon.
BY
Harness and Harris
ATTORNEYS.

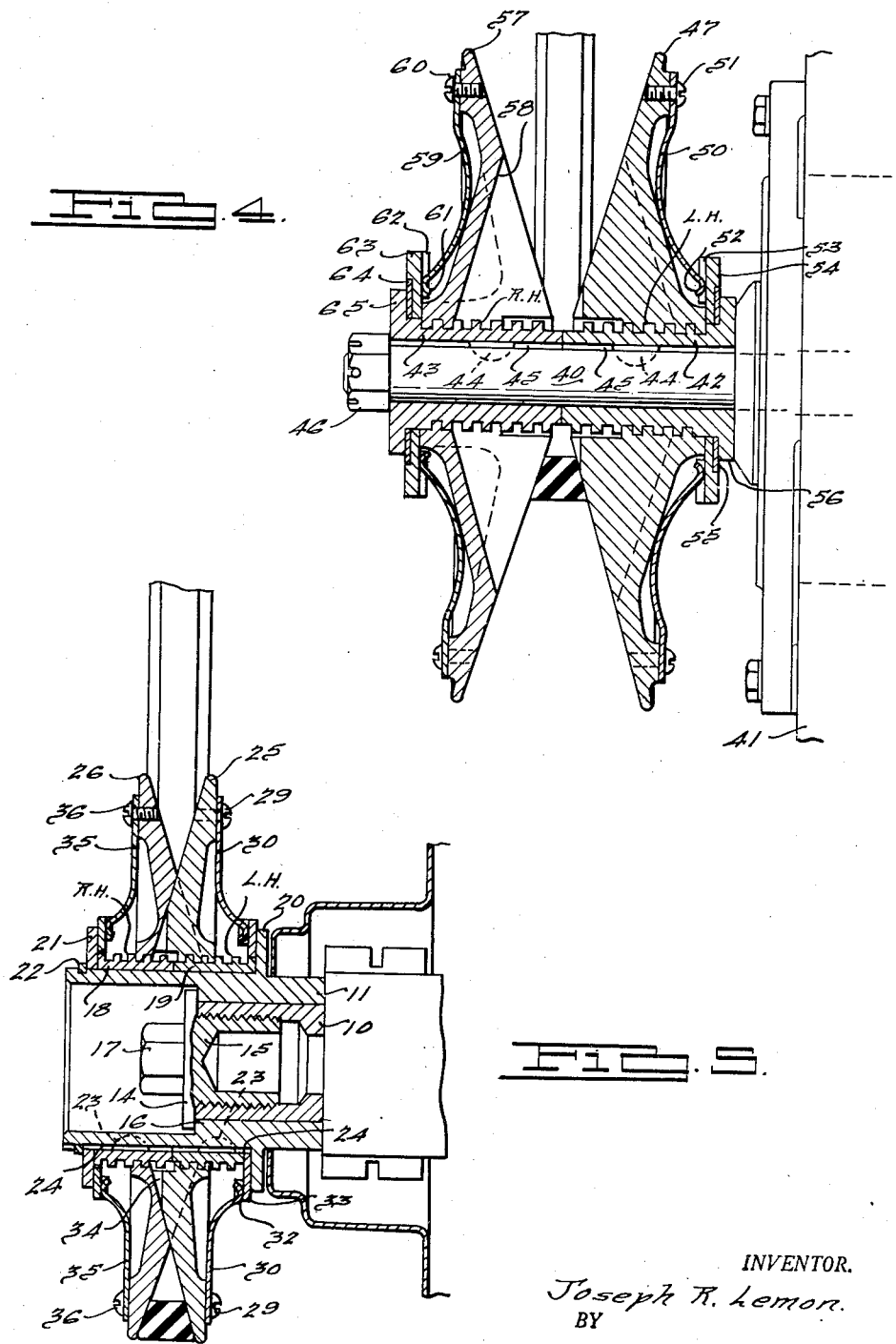

Aug. 9, 1949.  J. R. LEMON  2,478,289
DRIVE TRANSMITTING DEVICE
Filed June 23, 1945  3 Sheets-Sheet 3
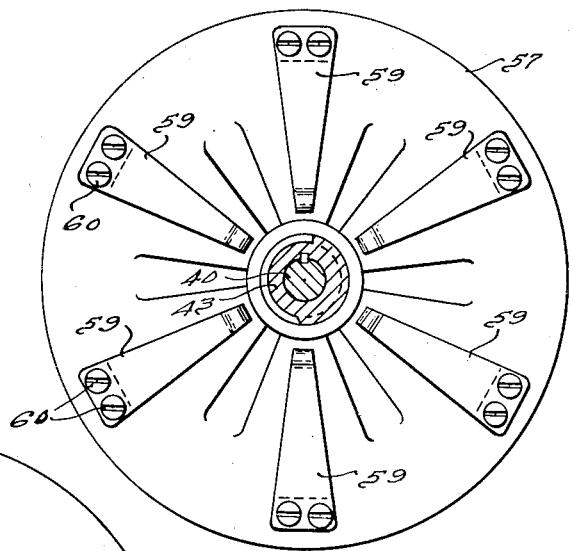
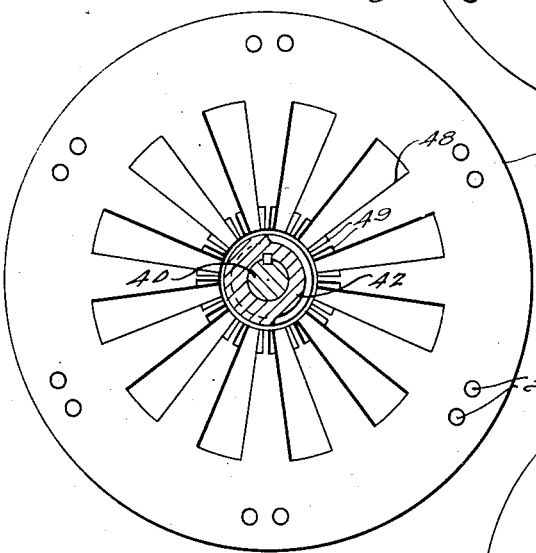
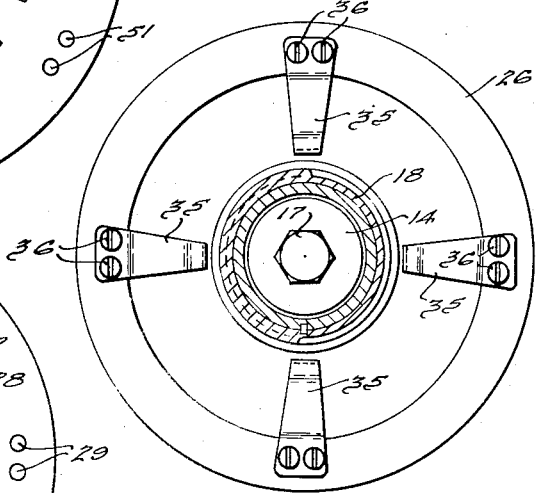
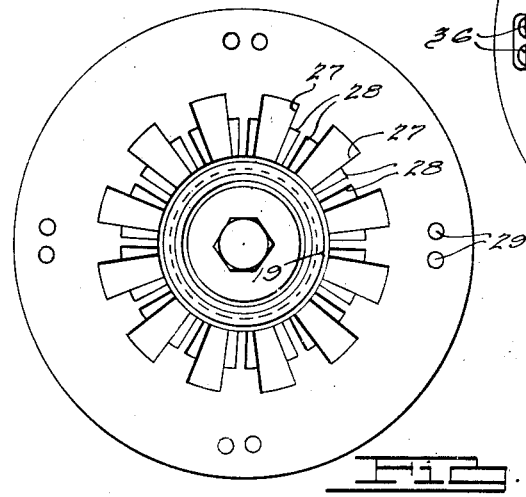
INVENTOR.
Joseph R. Lemon.
BY
Harness and Harris
ATTORNEYS.

Patented Aug. 9, 1949

2,478,289

UNITED STATES PATENT OFFICE 2,478,289

DRIVE TRANSMITTING DEVICE

Joseph R. Lemon, Detroit, Mich., assignor to Chrysler Corporation, Highland Park, Mich., a corporation of Delaware Application June 23, 1945, Serial No. 601,182

9 Claims. (Cl. 74—230.17)

This application relates to a device for driving one member within relatively narrow speed limits from another member operating within relatively wide speed limits. More specifically it relates to driving an electric generator from an automobile engine crankshaft.

It is usual in automobile practice to drive a generator from an engine crankshaft in such a way that the higher generator speeds produced by the higher engine speeds cause the generator to charge the battery at lower rates. I seek to control high generator speeds by means of a drive-transmitting arrangement between the engine shaft and the generator, which provides a much lower than usual ratio of generator speed to engine speed at high engine speeds and a higher ratio at low or idling engine speed sufficient to cause the generator to charge.

An object of the present invention is to provide an improvement in a means for transmitting drive at a variable speed ratio. This may involve a device operable at a lower speed ratio for higher input speeds, whereby a driven member may have a relatively narrow speed range for a relatively wide speed range of a driving member. This may be applied in the driving of a generator from an automobile engine.

A further object of the invention relates to the provision of a device operating at a variable speed ratio in response to variations in torque transmitted by the device. More specifically this may be employed for obtaining relatively narrow speed limits of a driven member from relatively wide speed limits of a driving member in a system in which the torque transmitted has some definite relation to speed. Such system may involve an automobile engine as the driving member, a generator as one driven member, and a fan as another driven member. The fan is to be driven at a speed more directly proportional to engine speed than is the generator and imposes a load increasing in such proportion to speed as is characteristic of a fan. The generator is to be driven at a speed the ratio of which to the engine speed is to decrease somewhat with engine speed. The increased load imposed by the fan at high speeds and/or increased load of the generator at high speeds brings about the reduction in the speed ratio.

Another object relates to improvements in a drive involving a belt and adjustable pulleys. The pulleys may be formed of sections mounted on threads in such a way as to be movable toward and away from one another in response to variations in pull imposed by or upon the belt for varying the diameter of the pulleys engaged by the belt.

Still another object is to provide a drive-transmitting device that will have a relatively low speed ratio of driven member to driving member at high speeds of the driving member, but will also effect a saving of power under this condition. The device may be applied to driving a generator from an automobile engine. It is known to employ for this purpose various speed controlling means between the engine and the generator, for example, a magnetic clutch, but a magnetic clutch makes the power losses relatively high in comparison with those arising from the use of the device of the present invention.

Other objects will appear from the disclosure.

In the drawings:

Fig. 1 is a diagrammatic representation of a belt and three pulleys drivingly connected with an engine crankshaft, a fan, and a generator;

Fig. 2 is a sectional view taken on the line 2—2 of Fig. 1;

Fig. 3 is a sectional view taken on the line 3—3 of Fig. 1;

Fig. 4 is a sectional view similar to Fig. 2 but with the parts in a different position;

Fig. 5 is a sectional view but with the parts in a different position;

Fig. 6 is a sectional view taken on the line 6—6 of Fig. 2;

Fig. 7 is a sectional view taken on the line 7—7 of Fig. 2;

Fig. 8 is a sectional view taken on the line 8—8 of Fig. 3; and

Fig. 9 is a sectional view taken on the line 9—9 of Fig. 3.

The reference character 10 designates an engine crankshaft, upon which is drivingly mounted a sleeve 11 by means of a key 12 fitting in a recess in the crankshaft 10 and in a keyway 13 in the sleeve 11. The sleeve 11 is retained against axial movement upon the crankshaft 10 to the left as viewed in Fig. 3 by means of a shoulder 14 on a plug 15 threaded into the end of the crankshaft 10. The shoulder 14 on the plug 15 engages a shoulder 16 formed on the inside of the sleeve 11. The plug 15 has a polygonal projection 17 engageable by a suitable tool such as a wrench for loosening or unloosening the plug. Mounted upon the sleeve 11 are a tubular section 18 having a right-hand thread, and a tubular section 19 having a left-hand thread. The tubular sections 18 and 19 are held between an outwardly projecting flange 20 formed on the sleeve 11 and a flat ring 21 retained on the sleeve 11 by a ring 22 fitting in a groove in the sleeve 11. The tubular sections 18 and 19 are held against rotational movement with respect to the sleeve 11 by means of keys 23 fitting in recesses in the sleeve 11 and in keyways 24 formed in the sections 18 and 19. A pulley section 25 has an internal thread engaging the left-hand thread formed on the tubular section 19, and a mating pulley section 26 has an internal thread engaging the right-hand thread formed on the tubular section 18. As seen in Figures 3 and 9 the inside face of the pulley section 25, or in other words, the face toward the pulley section 26, has formed therein a series of radially extending slots 27. The portions of the pulley section 25 between the slots are formed at their inner extremities with beveled faces 28 for a purpose to be described presently. As viewed in Figures 3 and 5 there are secured to the outer face of the pulley section 25 by means of screws 29, spring elements 30. These elements have curved inner ends 31 fitting in grooves 32 formed in a bearing ring 33 clamped between the flange 20 on the sleeve 11 and the pulley section 25. The inner face of the pulley section 26 has recesses 34 which receive the portions of the pulley section 25 between the slots 27. As viewed in Fig. 8, spring elements 35 are secured by screws 36 to the outside face of the pulley section 26 and have inner curved ends 37 fitting in recesses 38 formed in a bearing ring 39, clamped ends 37 fitting in recesses 38 formed in a bearing ring 39, clamped between the pulley section 26 and the ring 21. The spring elements 30 and 35 are relatively strong as will be described later.

A generator drive shaft 40 projects from a housing 41. Mounted upon the shaft 40 are a tubular section 42 having a left-hand thread and a tubular section 43 having a right-hand thread. The sections 42 and 43 are held against rotative movement with respect to the shaft 40 by means of keys 44 fitting in recesses in the shaft 40 and received in the keyways 45 formed in the tubular sections 42 and 43. The tubular sections 42 and 43 are held on a shaft 40 by means of a nut 46 threaded on the end of the shaft 40. A pulley section 47 has an internal thread engaging the left-hand thread formed on the tubular section 42. As is shown in Fig. 7 the inside face of the pulley section 47 has a plurality of radially extending grooves 48 and the inner extremities of the portions between the grooves are beveled as indicated at 49 for a purpose to be described later. As seen in Figs. 2 and 4, spring elements 50 are secured to the outer face of the pulley section 47 by means of screws 51. The spring elements 50 are provided with curved inner ends 52 fitting in grooves 53 formed in bearing rings 54. The ring 54 is formed with the section 55 of bearing material held in engagement with an external flange 56 formed on the tubular section 42. A mating pulley section 57 has on its inner face, grooves 58 receiving the portions of the pulley 47 between the grooves 48. Spring elements 59 are secured to the outer face of the pulley section 57 by means of screws 60 as shown in Figs. 4 and 6. The spring elements 59 are provided with curved ends 61 fitting in grooves 62 formed in a bearing ring 63. The bearing ring 63 has a section 64 formed of bearing material engaging an outwardly extending flange 65 formed on the tubular section 43. The spring elements 50 and 59 are relatively weak.

The pulley 25, 26 connected with the engine crankshaft 10 and the pulley 47, 57 connected with the generator shaft 40 are engaged by a belt 66 which also engages a pulley 67 drivingly connected to a fan not shown. According to Fig. 1 the belt 66 has two positions with respect to the pulleys 25, 26 and 47, 57. In the full line position the belt engages the pulley 25, 26 at a relatively small diameter and the pulley 47, 57 at a relatively large diameter. In the dash dot position the belt engages the pulley 25, 26 at a relatively large diameter and the pulley 47, 57 at a relatively small diameter. The engagement of the belt with the fan pulley 67 does not change since this pulley is not formed of adjustable sections. Figs. 4 and 5 correspond to the full line position of Fig. 1 and Figs. 2 and 3 to the dash dot position of Fig. 1. At idling speed of the engine crankshaft 10 the pulley sections are relatively positioned as shown in Figs. 4 and 5. Since the belt 66 engages the pulley sections 25 and 26 at the maximum diameter, the belt speed will be a maximum for a given angular velocity of the pulley 25, 26. Since the belt 66 engages the pulley sections 47 and 57 at a minimum diameter, the generator shaft 40 will have a maximum angular velocity for a given linear velocity of the belt 66. Therefore, the ratio of the generator shaft speed to that of the engine crankshaft will be at a maximum, and this is as it should be since the speed of the engine is low at idling and it is desirable to have the generator charge at idling speed. The strong elements 30 and 35 should be sufficiently strong to maintain the pulley sections 25 and 26 as close to one another as possible, as shown in the position of Fig. 5 and, therefore, must be strong enough to overcome the strength of the spring elements 50 and 59 acting to move the pulley sections 47 and 57 toward one another, and the pull of the belt 66 upon the pulley sections 47 and 57 tending to rotate these pulley sections toward one another upon the tubular sections 42 and 43, and the pull exerted by the fan pulley 67 and the generator pulley 47, 57 on the belt 66 at idling speed, which with the pulleys rotating clockwise as shown in Fig. 1 tends to make the pulley sections 25 and 26 move outwardly away from one another against the action of the spring elements 30 and 35. As the speed of the engine crankshaft 10 increases, the pull exerted by the fan pulley 67 and the generator pulley 47, 57 on the belt 66 together with the spring elements 50 and 59 is sufficient to screw the pulley sections 25 and 26 outwardly from one another along the tubular sections 18 and 19. The pulley sections 47 and 57 will be screwed along the tubular sections 42 and 43 toward one another from the position of Fig. 4 to that of Fig. 2. The pulley sections 25 and 26 move outwardly from one another, and the pulley sections 47 and 57, toward one another until the increased resistance of the spring elements 30 and 35 balances the outward forces on the section 25 and 26 exerted by the belt 66, the inward forces on the sections 47 and 57 exerted by the belt, and the decreased resistance of the spring elements 50 and 59. Thus position of the pulley sections is dependent upon belt pull. Belt pull is determined by generator load, which is somewhat proportional to generator speed, and by fan load, which is in such proportion to speed as is characteristic of a fan. The fan speed is fairly directly proportional to the engine speed, because the ratio of fan speed to engine speed varies only as the ratio varies between the adjustable engine pulley 25, 26 and the fixed engine pulley 67. In view of these things it will be seen that the position of the pulley sections is dependent upon belt pull.

Finally as the engine speed increases the belt reaches the full line position of Fig. 1 in which it engages a minimum diameter of the pulley 25 and 26 as shown in Fig. 3 and a maximum diameter of the pulley 47, 57 as shown in Fig. 2. In this condition the speed ratio of the generator shaft 40 to the engine shaft 10 will be a minimum, since the ratio of the linear speed of the belt 66 to the angular velocity of the crankshaft 10 is at a minimum, while at the same time the ratio of the angular velocity of the generator shaft 40 to the linear speed of the belt 66 is at a minimum. By virtue of the aforementioned arrangement of parts the speed of the generator shaft 40 may not be held constant for various speeds of the engine crankshaft 10, but the generator shaft will have a smaller percentage of change of speed than will the crankshaft. The result is a more nearly constant speed of the generator shaft 40 for various crankshaft speds. When the speed of the crankshaft 10 is reduced, the pull exerted by the fan pulley 67 and the generator pulley 47, 57 becomes less and when it becomes less to the point where the strength of the spring elements 30 and 35 on the pulley sections 25 and 26 is sufficient to overcome the strength of the spring elements 50 and 59 on the pulley sections 47 and 57 and the forces tending to keep the pulley sections 25 and 26 apart and tending to keep the pulley sections 47 and 57 together there is a return in the direction of Figs. 4 and 5. When the speed of the crankshaft is reduced to idling the pulley sections reach the position of Figs. 4 and 5.

If, because of having become completely disengaged as shown in Fig. 3, the pulley sections 25 and 26 are slightly out of rotational alignment so that there would be difficulty in obtaining the engagement of the pulley sections 25 and 26 of Fig. 5 the beveled surfaces 28 formed on the inner face of the pulley section 25 adjacent the recesses 27 will correct this. The portions of the inner face of the pulley section 26 between the recesses 34 will strike the beveled surfaces 28 on the pulley section 25 and thereby suitable relative rotation between the pulley sections 25 and 26 will take place for a proper and complete engagement of these pulley sections as shown in Fig. 5. The beveled surfaces 49 formed on the inner face of the pulley section 47 serve the same purpose. If there is slight rotational misalignment of the pulley sections 47 and 57 because of disengagement as shown in Fig. 4, contact of the portions of the inner face of the pulley section 57 between the grooves 58 with the beveled surfaces 49 will produce sufficient relative rotation of the pulley sections 47 and 57 for a proper and complete engagement of these sections as shown in Fig. 2.

The curved ends 31 of the spring elements 30 are engaged by grooves 32 in the bearing ring 33 so that there can be no relative rotation between the spring elements 30 and the bearing ring 33 such as would cause wear of the spring elements 30, which might arise upon rotation of the pulley section 25 with respect to the tubular section 19. For the same reason the spring elements 35, 50, and 59 fit respectively, in grooves 38, 53, and 62 formed in bearing rings 39, 54, and 63, respectively.

The spring elements 30 and 35 have been stated to be relatively strong. As previously stated, they must be strong enough to overcome the tendency of the belt to separate the pulley sections 25 and 26 and to bring together the pulley sections 47 and 57 and the strength of the spring elements 50 and 59 at various speeds less than a maximum.

On the other hand, the spring elements 50 and 59 have been described as relatively weak, because they serve only to urge the pulley sections 47 and 57 together slightly to maintain the belt 66 tight.

The threads on the tubular sections 18, 19, 42, and 43 must be sufficiently steep that friction due to straight axial forces applied by the belt and by the spring elements will not prevent the sections from moving inwardly and outwardly under the rotational forces applied by the belt. The pulley sections should probably fit the threads on the tubular sections somewhat loosely. In order to obtain a sufficient steepness of thread, multiple threads may be employed instead of single threads.

I claim:

1. A system for driving an electric generator shaft within relatively narrow speed limits by a belt from an engine shaft operating within relatively wide speed limits and for also driving by the belt from the engine shaft a fan of the type increasing the load upon the belt with increase in speed, said system comprising a pair of adjustable pulleys each formed of sections movable toward and away from one another to form a V-groove of varying diameter for a given width, an ordinary pulley drivingly connected to the fan, oppositely directed screw threads associating the sections of one adjustable pulley with the engine shaft in such a way as to cause increase in belt load due to increase in fan speed due to increase in engine shaft speed to move the sections of said one pulley apart for making the belt engage the said one pulley at a lesser diameter and decrease in belt load to move the sections of the said one pulley toward one another for making the belt engage the said one pulley at a greater diameter, and oppositely directed screw threads associating the sections of the other adjustable pulley with the generator shaft in such a way as to cause the aforesaid increase in belt load to move the sections of the said other pulley toward one another for making the belt engage the said other pulley at a greater diameter and the aforesaid decrease in belt load to move the sections of the said other pulley apart for making the belt engage the said other pulley at a lesser diameter.

2. A system for driving an electric generator shaft within relatively narrow speed limits by a belt from an engine shaft operating within relatively wide speed limits and for also driving by the belt from the engine shaft a fan of the type increasing the load upon the belt with increase in speed, said system comprising a pair of adjustable pulleys each formed of sections movable toward and away from one another to form a V-groove of varying diameter for a given width, an ordinary pulley drivingly connected to the fan, oppositely wound threads fixedly associated with the engine shaft and engaging the sections of one adjustable pulley so as to cause an increase in belt load due to increase in fan speed due to increase in engine shaft speed to move the sections of the said one pulley apart for making the belt engage the said one pulley at a lesser diameter, relatively strong resilient means acting against the sections of the said one pulley so as to be effective upon decrease in the belt load to move the sections of the said one pulley toward one another for making the belt engage the said one pulley at a greater diameter, oppositely wound threads fixedly associated with the generator shaft and engaging the sections of the other adjustable pulley so as to cause the aforesaid increase in belt load to move the sections of the said other pulley toward one another for making the belt engage the said other pulley at a greater diameter, and relatively weak resilient means urging the sections of the said other pulley toward one another so as to keep the belt tight by lightly resisting moving apart of the sections of the said other pulley due to belt action due to moving together of the sections of the said one pulley due to the action of the relatively strong resilient means upon decrease in belt load.

3. A system for driving a first rotatable driven member within relatively narrow speed limits by a belt from a rotatable driving member and for also driving by the belt from the driving member a second rotatable driven member imposing upon the belt an increased load with increase in speed, said system comprising a pair of adjustable pulleys each formed of sections movable toward and away from one another to form a V-groove of varying diameter for a given width, an ordinary pulley drivingly connected to the second rotatable driven member, oppositely wound threads fixedly associated with the driving member and engaging the sections of one adjustable pulley so as to cause an increase in belt load due to increase in speed of the second driven member due to increase in driving member speed to move the sections of the said one pulley apart for making the belt engage the said one pulley at a lesser diameter, relatively strong resilient means acting against the sections of the said one pulley so as to be effective upon decrease in the belt load to move the sections of the said one pulley toward one another for making the belt engage the said one pulley at a greater diameter, oppositely wound threads fixedly associated with the first driven member and engaging the sections of the other adjustable pulley so as to cause the aforesaid increase in belt load to move the sections of the said other pulley toward one another for making the belt engage the said other pulley at a greater diameter, and relatively weak resilient means urging the sections of the said other pulley toward one another so as to keep the belt tight by lightly resisting moving apart of the sections of the said other pulley due to belt action due to moving together of the sections of the said one pulley due to the action of the relatively strong resilient means upon decrease in belt load.

4. A system for driving a rotatable driven member within relatively narrow speed limits by a belt from a rotatable driving member operating between relatively wide speed limits, said system comprising a pair of pulleys each formed of sections adjustable toward and away from one another to vary the diameter of the pulley engaged by the belt, oppositely wound threads fixedly associated with the driving member and engaging the sections of one pulley so as to cause an increase in belt load due to speed increase to move the sections of the said one pulley apart for making the belt engage the pulley at a lesser diameter, relatively strong resilient means acting against the sections of the said one pulley so as to be effective upon decrease in belt load due to decrease in speed to move the sections of the said one pulley toward one another for making the belt engage the said one pulley at a greater diameter, oppositely wound threads fixedly associated with the driven member and engaging the said other pulley so as to cause the aforesaid increase in belt load to move the sections of the said other pulley toward one another for making the belt engage the said other pulley at a greater diameter, and relatively weak resilient means urging the sections of the said other pulley toward one another so as to keep the belt tight by lightly resisting moving apart of the sections of the said other pulley due to belt action due to moving together of the sections of the said one pulley due to the action of relatively strong resilient means upon decrease in belt load.

5. A system for driving a rotatable driven member within relatively narrow speed limits by a belt from a rotatable driving member operating between relatively wide speed limits, said system comprising a pair of pulleys each formed of sections adjustable toward and away from one another to vary the diameter of the pulley engaged by the belt, oppositely directed screw threads associating the sections of one pulley with the driving member so as to cause increase in load due to increase in speed to move the sections of the said one pulley apart for making the belt engage the pulley at a lesser diameter, relatively strong resilient means acting against the sections of the said one pulley so as to be effective upon decrease in belt load due to decrease in speed to move the sections of the said one pulley toward one another for making the belt engage the said one pulley at a greater diameter, oppositely directed screw threads associating the sections of the other pulley with the driven member so as to cause the aforesaid increase in belt load to move the sections of the said other pulley toward one another for making the belt engage the said other pulley at a greater diameter, and relatively weak resilient means urging the sections of the said other pulley toward one another so as to keep the belt tight by lightly resisting moving apart of the sections of the said other pulley due to belt action due to moving together of the sections of the said one pulley due to the action of relatively strong resilient means upon decrease in belt load.

6. A system for driving an electric generator shaft within relatively narrow speed limits by a belt from an engine shaft operating within relatively wide speed limits and for also driving by the belt from the engine shaft a fan of the type increasing the load upon the belt with increase in speed, said system comprising a pair of adjustable pulleys each formed of sections adapted for relative movement toward and away from one another to form a V-groove of varying diameter for a given width, an ordinary pulley drivingly connected to the fan, a screw thread fixedly associated with the engine shaft and engaging one section of one adjustable pulley so as to cause an increase in belt load due to increase in fan speed due to increase in engine shaft speed to increase the spacing of the sections of the said one pulley for making the belt engage one pulley at a lesser diameter, relatively strong resilient means acting against the sections of the said one pulley so as to be effective upon decrease in the belt load to decrease the spacing of the sections of the said one pulley for making the belt engage the said one pulley at a greater diameter, a threaded section secured to the generator shaft and engaging one section of the other adjustable pulley so as to cause the aforesaid increase in belt load to decrease the spacing of the sections of the said other pulley for making the belt engage the said other pulley at a greater diameter, and relatively weak resilient means urging the sections of the said other pulley toward one another so as to keep the belt tight by lightly resisting increase in spacing of the sections of the said other pulley due to belt action due to decrease in spacing of the sections of the said one pulley due to the action of the relatively strong resilient means upon decrease in belt load.

7. A system for driving a first rotatable driven member within relatively narrow speed limits by a belt from a rotatable driving member and for also driving by the belt from the driving member a second rotatable driven member imposing upon the belt an increased load with increase in speed, said system comprising a pair of adjustable pulleys each formed of sections adapted for relative movement toward and away from one another to form a V-groove of varying diameter for a given width, an ordinary pulley drivingly connected to the second rotatable driven member, a screw thread fixedly associated with the driving member and engaging one section of one adjustable pulley so as to cause an increase in belt load due to increase in speed of the second driven member due to increase in driving member speed to increase the spacing of the sections of the said one pulley for making the belt engage the said one pulley at a lesser diameter, relatively strong resilient means acting against the sections of the said one pulley so as to be effective upon decrease in the belt load to decrease the spacing of the sections of the said one pulley for making the belt engage the said one pulley at a greater diameter, a screw thread fixedly associated with the first driven member and engaging one section of the other adjustable pulley so as to cause the aforesaid increase in belt load to decrease the spacing at the sections of the said other pulley for making the belt engage the said other pulley at a greater diameter, and relatively weak resilient means urging the sections of the said other pulley toward one another so as to keep the belt tight by lightly resisting increase in spacing of the sections of the said other pulley due to belt action due to decrease in spacing of the sections of the said one pulley due to the action of the relatively strong resilient means upon decrease in belt load.

8. A system for driving a rotatable driven member within relatively narrow speed limits by a belt from a rotatable driving member operating between relatively wide speed limits, said system comprising a pair of pulleys each formed of sections adapted for relative movement toward and away from one another to vary the diameter of the pulley engaged by the belt, a screw thread fixedly associated with the driving member and engaging one section of one pulley so as to cause an increase in belt load due to speed increase to increase the spacing of the sections of the said one pulley for making the belt engage the pulley at a lesser diameter, relatively strong resilient means acting against the sections of the said one pulley so as to be effective upon decrease in belt load due to decrease in speed to decrease the spacing of the sections of the said one pulley for making the belt engage the said one pulley at a greater diameter, a screw thread fixedly associated with the driven member and engaging the said other pulley so as to cause the aforesaid increase in belt load to decrease the spacing of the sections of the said other pulley for making the belt engage the said other pulley at a greater diameter, and relatively weak resilient means urging the sections of the said other pulley toward one another so as to keep the belt tight by lightly resisting increase in spacing of the sections of the said other pulley due to belt action due to decrease in spacing of the sections of the said one pulley due to the action of relatively strong resilient means upon decrease in belt load.

9. A system for driving an electric generator shaft within relatively narrow speed limits by a belt from an engine shaft operating within relatively wide speed limits and for also driving by the belt from the engine shaft a fan of the type increasing the load upon the belt with increase in speed, said system comprising a pair of adjustable pulleys each formed of sections movable toward and away from one another to form a V-groove of varying diameter for a given width, an ordinary pulley drivingly connected to the fan, a screw thread fixedly associated with the engine shaft and engaging one section of one adjustable pulley in such a way as to cause increase in belt load due to increase in fan speed due to increase in engine shaft speed to increase the spacing of the sections of said one pulley for making the belt engage the said one pulley at a lesser diameter and decrease in belt load to decrease the spacing of the sections of the said one pulley for making the belt engage the said one pulley at a greater diameter, and a screw thread fixedly associated with the generator shaft and engaging one section of the other adjustable pulley in such a way as to cause the aforesaid increase in belt load to decrease the spacing of the sections of the said other pulley for making the belt engage the said other pulley at a greater diameter and the aforesaid decrease in belt load to increase the spacing of the sections of the said other pulley for making the belt engage the said other pulley at a lesser diameter.

JOSEPH R. LEMON.

REFERENCES CITED

The following references are of record in the file of this patent:

UNITED STATES PATENTS

| Number | Name | Date |
|---|---|---|
| 1,279,547 | Hueber | Sept. 24, 1918 |
| 2,170,838 | Rossman | Aug. 29, 1939 |
| 2,173,661 | Perrine | Sept. 19, 1939 |
| 2,256,699 | Almen | Sept. 23, 1941 |
| 2,260,795 | Burns | Oct. 28, 1941 |
| 2,317,339 | Steven | Apr. 20, 1943 |
| 2,330,136 | Nardone | Sept. 21, 1943 |